April 20, 1965  F. M. POTTER  3,179,872
ROTOR CONSTRUCTION OF CASCADED GENERATORS
Filed Nov. 15, 1961  2 Sheets-Sheet 1

INVENTOR.
FREDERICK M. POTTER
BY
ATTORNEY

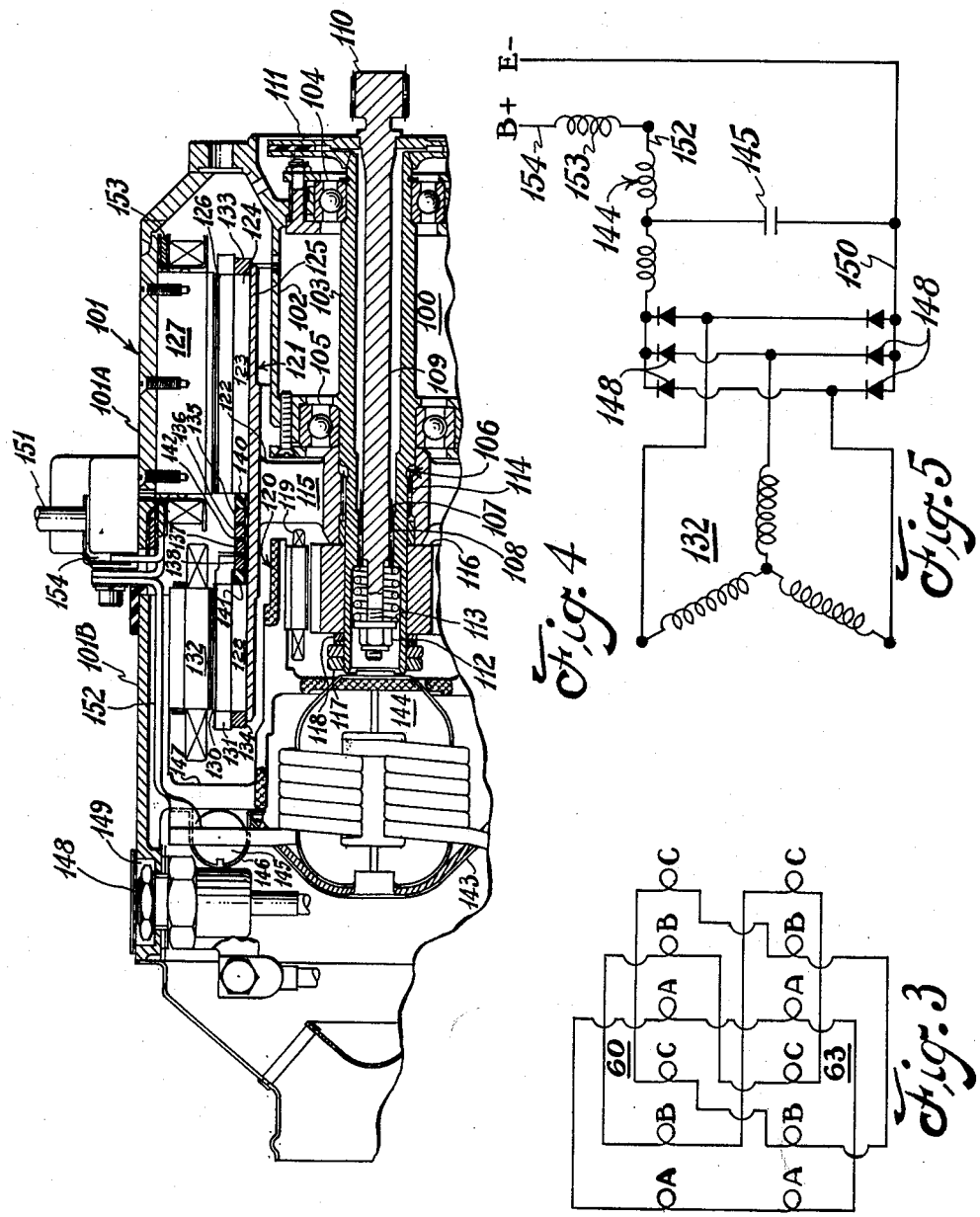

United States Patent Office 3,179,872
Patented Apr. 20, 1965

3,179,872
ROTOR CONSTRUCTION OF CASCADED
GENERATORS
Frederick Milton Potter, Little Silver, N.J., assignor to The
Bendix Corporation, Eatontown, N.J., a corporation of
Delaware
Filed Nov. 15, 1961, Ser. No. 152,566
7 Claims. (Cl. 321—62)

The present invention relates to dynamoelectric machines and more particularly to a rotor for a dynamoelectric machine.

There is a need for a dynamoelectric machine that will function as a generator without commutator, brushes or slip rings. Heretofore this has presented a problem in that it was difficult to accomplish the desired output and still be within a reasonable size.

The present invention utilizes the principle of cascading two generators to produce a high frequency output which may be rectified for D.C. The output generator, similar to a wound rotor synchronous machine, has its rotor energized from the A.C. output of another machine, the armature of which is positioned adjacent thereto on the same shaft. This machine, similar to a salient stationary field type A.C. generator, is energized from a suitable source of D.C. The principle of operation is to reverse the phase rotation of the current from the input rotor to the output rotor so that the frequency generated in the input stage can be added to that of the output stage and create electrical power at double the frequency of the individual units. A novel feature of the design is the means for reversing the phase rotation from one rotor to the other. Another feature is the single turn coils.

An object of the invention is to provide a novel dynamoelectric machine.

Another object of the invention is to provide a novel brushless D.C. generator.

Another object of the invention is to provide an improved method of cascading generators.

Another object of the invention is to provide a novel rotor construction for a dynamoelectric machine.

Another object of the invention is to provide a rotor winding having low voltage per coil.

Another object of the invention is to provide an improved rotor having single turn coils.

Another object of the invention is to provide novel means for reversing the phase rotation between cascaded rotors.

The above and other objects and features of the invention will appear more fully hereinafter from a consideration of the following description taken in connection with the accompanying drawing wherein one embodiment is illustrated by way of example.

In the drawing:

FIGURE 3 is a schematic diagram illustrating the phase reversal of the windings.

FIGURE 4 is a sectional view of a dynamoelectric machine illustrating a further embodiment of the invention.

FIGURE 5 is a schematic diagram illustrating the output connections of the machine of FIGURE 4.

Figure 1:
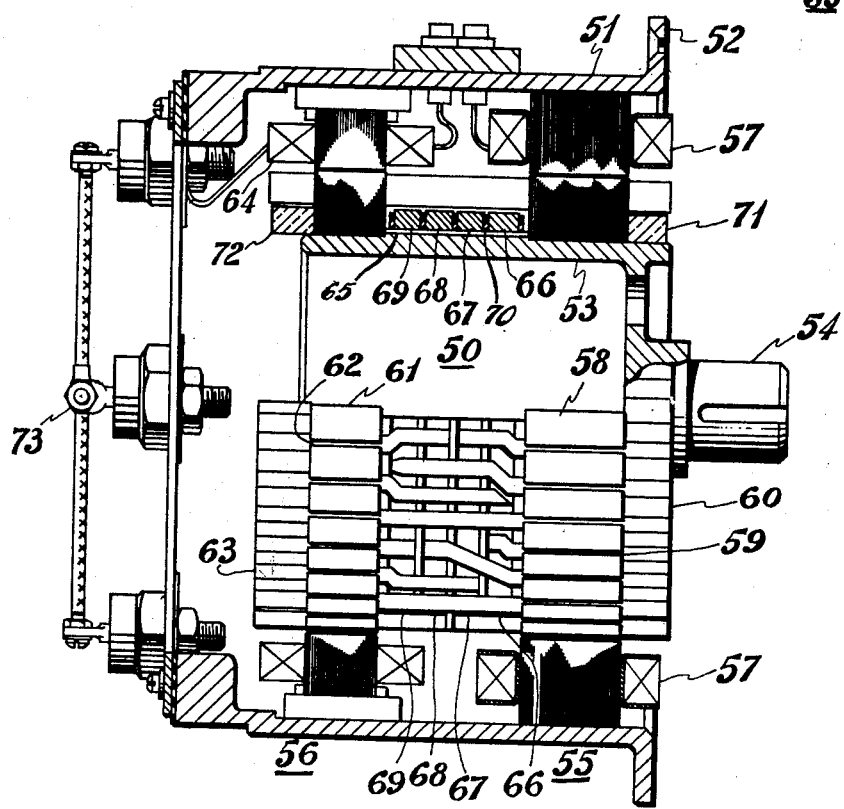
FIGURE 1 is a sectional view of a dynamoelectric machine embodying the invention.

Referring now to the drawing, in FIGURE 1 a dynamoelectric machine is indicated generally by the numeral 50 and has a housing member 51 which has a flanged member 52 for mounting on a prime mover (not shown). The machine 50 has a hollow shaft 53 which is terminated at one end by a stub shaft 54 which is adapted to be supported in the housing member 51 by a driving member of the prime mover (not shown) which has its own bearing. It is understood, however, that the shaft 53 could be supported by bearings in a conventional manner in the housing 51.

The machine 50 has an input section 55 and output section 56. The input machine is similar to a salient stationary field type of A.C. generator and has a plurality of field coils 57 secured in the housing 51 in a conventional manner. The coils 57 may be energized from any suitable source of D.C. (not shown). The input machine has a rotating armature member including a laminated core 58 mounted on the shaft 53. The core 58 has a plurality of slots 59 which carry an alternating current armature winding 60. The winding 60 is similar to the rotor winding of an induction motor and features single turn coils.

The output section 56 has a rotor including a laminated core 61 mounted on the shaft 53. The core 61 has a plurality of slots 62, of the same number as the core 58, which carry a winding 63 also featuring single turn coils. The section 56 has an output stator winding 64 secured in the housing 51 in a conventional manner.

One of the novel features of the invention is the means to reverse the phase rotation of the current from the input rotor to the output rotor so that the frequency generated in the input stage can be added to that of the output stage and create electrical power at double the frequency of the individual units. A three phase, twelve pole machine has been selected for purposes of illustration, however, it is understood that this is not intended to be a limitation as the principle involved is applicable to other combinations of phases and poles. Mounted on shaft 53 and insulated therefrom by insulator 65 are conducting rings 66, 67, 68 and 69. Insulators 70 are interposed between the rings and also to insulate the rings from the laminations 58 and 61. The outer ends of the winding 60 are connected to a ring 71 by brazing or other suitable means. In like manner, the outer ends of the windings 63 are connected to a ring 72.

Figure 2:
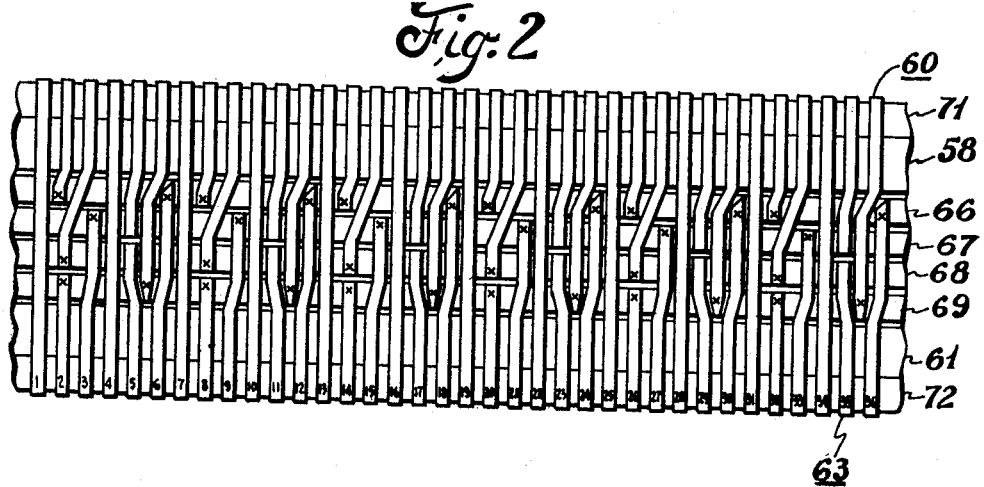
FIGURE 2 is a winding diagram for the rotor of machine of FIGURE 1.

In order to illustrate the connections between the windings 60 and 63 reference is now made to FIGURES 2 and 3 which will provide a better understanding of the invention. The windings 60 and 63 have the same number of conductors which for the purpose of illustration have been numbered from 1 to 36. The conductor 1 of the winding 60 is connected to the conductor 1 of the winding 63. The conductor 2 of the winding 60 is connected to the ring 66 as indicated by the X on the drawing. Also connected to the ring 66 is the conductor 6 of the winding 63. The conductor 3 of the winding 63 and the conductor 5 of the winding 60 are connected to the ring 67. Connected to the ring 68 are the conductor 3 of the winding 60 and the conductor 5 of the winding 63. The conductor 2 of the winding 63 and the conductor 6 of the winding 60 are connected to the ring 69. The conductor 4 of the winding 60 is connected to the conductor 4 of the winding 63. The aforenoted sequence is repeated six times.

FIGURE 3 illustrates the phase relationship between the phases of the winding 60 and those of the winding 63. This sequence is repeated until the windings are completed. The number of poles will determine the number of times the sequence is repeated which is one half of the number of poles. A rectifier assembly 73 may be provided if a D.C. output is desired. The output from the winding 64 would be connected to the rectifier assembly 73 and from there to the output terminals.

Reference is now made to FIGURE 4 of the drawings in which a different embodiment of the invention is illustrated. A dynamoelectric machine is indicated generally by the numeral 100 and includes a housing 101 which for the convenience of assembly is made in two sections 101A and 101B and secured together by bolts or other conventional means. The section 101A has a section 102 which extends inwardly. A hollow shaft 103 is supported in the section 102 by bearings 104 and 105 and has a portion 106 extending beyond the bearing 105. The shaft 103 has an internal splined section 107 adapted to mate with an external spline 108 of a torsional shaft 109 which terminates at its outer end in a splined head 110 adapted to mate with a driving member (not shown). The shaft 109, in addition to the splined connection, is connected to the shaft 103 by means of a vibration damper 111. A nut 112 and spring 113 secure the shaft 109 in position within the shaft 103.

The shaft 103 has an externally splined section 114 on the portion 106 upon which a rotor assembly 115 is splined or keyed for rotation therewith. Also on the portion 106 and adjacent to the rotor member is a permanent magnet rotor 116. A nut 117 and spacers 118 hold the permanent magnet rotor 116 and the rotor member 115 in position on the shaft 103. Surrounding the rotor 116 and in inductive relationship therewith is a stator winding 119 secured to an inwardly extending portion 120 of the section 101B. The stator winding 119 is secured in the portion 120 by bolts (not shown), or in any other conventional manner, and together with the rotor 116 form a PM generator, the function of which will be explained later.

The rotor assembly 115 has a cylindrical section 121 extending both ways from a hub 122 and partially telescoping the sections 102 and 120 of the housing 101. Mounted on the cylindrical section 121 is a rotating armature 123 including a laminated core 124 having a plurality of slots 125 which carry an alternating current armature winding 126. The winding 126 is similar to that of the winding 60 previously described and features single turn coils. Located in the housing section 101A and in inductive relationship with the winding 126 are a plurality of field coils 127.

Also mounted on the section 121 of the rotor assembly is a rotating assembly 128 including a laminated core 129 having a plurality of slots 130 which carries a winding 131 having an equal number of single turn coils as that of the winding 126. Located in the housing section 101B and in inductive relationship with the winding 131 is a three phase output winding 132. The output stage which includes the windings 131 and 132 functions partially as a rotating transformer with a part of the output being transformed across the gap from the first stage and the remainder of the output by generator action.

The outer ends of the winding 126 are connected together by a conducting ring 133 and the outer ends of the winding 131 are connected together by a conducting ring 134. The conductors of the winding 126 are connected to the conductors 131 by means of conducting rings 135, 136, 137 and 138 in the same sequence as that illustrated and described in FIGURES 2 and 3. An insulator 139 is provided between the rings 135, 136, 137 and 138 and the section 121. Also insulating spacers 140 and 141 are provided to insulate the rings from the assemblies 123 and 128 and also insulating spacers 142 between the rings.

Mounted in the section 120 of the housing 101 by means of bracket 143 is an inductance 144. Also a capacitor 145 is mounted by a bracket 146 on a member 147 which attaches the section 120 to the housing 101. A plurality of rectifiers 148 are mounted in openings 149 around the periphery of the section 101B of the housing 101.

The stator winding 119 of the PM generator is excited by the permanent magnet rotor 116 and is connected by conductors (not shown) to energize the field winding 127. A regulator of any suitable type may be provided between the output of the PM generator and field windings 127 to control the energization thereof. Energization of the field windings 127 induces voltages in the three phase armature windings 126 which in turn are connected to the armature windings 131 as illustrated in FIGURES 2 and 3. Energization of the winding 131 provides part of the power and the excitation for the output winding 132. The output from the winding 132 is connected as shown in FIGURE 5 to the input of the rectifiers 148 which are connected as a three phase full wave rectifier. The negative output terminal of the rectifiers 148 is connected by conductor 150 to negative terminal 151. The positive output terminal of the rectifiers 148 is connected to one side of the center tapped inductance 144 and the other side of the inductance is connected by conductor 152 to one end of a series field winding 153 located adjacent to and for coacting with the field windings 127. The other end of the series field winding 153 is connected by conductor 154 to the B+ terminal. The capacitor 145 is connected between the center tap of the inductance 144 and the conductor 150.

In operation, the PM generator provides energization for the input section of the first stage. The output from the PM generator is rectified and is connected to the stator winding of the first stage. A voltage regulator may be inserted between the output of the PM generator and the first stage stator winding. Through generator action, the rotating winding of the first stage is energized. The rotating winding of the first stage is connected as previously described to the rotating winding of the second or output stage. By a combination of transformer and generator action, the stator winding of the output stage is energized at double the frequency of the rotating winding of the first stage.

The output of the stator winding of the output stage may be rectified and filtered as shown in FIGURE 5, thus providing a brushless D.C. generator. It is understood, however, that the A.C. output could be utilized if desired.

Although only two embodiments of the invention have been illustrated and described, various changes in the form and relative arrangement of the parts, which will now appear to those skilled in the art, may be made without departing from the scope of the invention.

What is claimed is:

1. A dynamoelectric machine comprising a housing, a shaft mounted for rotation in said housing, an input stator winding mounted in said housing, a first three phase rotor mounted on said shaft in inductive relationship with said input stator winding, a second three phase rotor mounted on said shaft, an output stator winding mounted in said housing in inductive relationship with said second three phase rotor, and means including a plurality of conducting bands mounted on said shaft between said rotors to connect said rotors with the phases transposed.

2. A dynamoelectric machine, comprising a housing, a shaft mounted for rotation in said housing, a permanent magnet rotor secured to said shaft, a stator winding supported in said housing and positioned in inductive relationship with said permanent magnet rotor, a spider member secured to said shaft, a first three phase rotor winding on said spider member, an excitation stator winding supported in said housing and positioned in inductive relationship with said first three phase rotor winding, means for energizing said excitation winding from the output of said permanent magnetic generator, a second three phase rotor winding on said spider member, an output winding supported in said housing and positioned in inductive relationship with said second three phase rotor winding, and means for connecting said three phase rotor windings together with the phase rotation reversed.

3. The combination as set forth in claim 2 and including means for rectifying the output from said output winding.

4. The combination as set forth in claim 2 in which the means for connecting said three phase rotor windings together include a plurality of conducting rings.

5. A dynamoelectric machine comprising a housing, a shaft mounted for rotation in said housing, an excitation winding mounted in said housing, a first three phase rotor winding mounted on said shaft in inductive relationship with said excitation winding, a second three phase rotor winding mounted on said shaft, a three phase output winding mounted in said housing in inductive relationship with said second three phase rotor winding, a plurality of conducting rings mounted on said shaft between said rotor windings, and means connecting said rotor windings to said conducting rings with the phase rotation reversed.

6. The combination as set forth in claim 5 in which the A phases of each pole group are connected together, the B phase of the first pole group of said first rotor is connected to the C phase of the second pole group of said second rotor, the C phase of the first pole group of said first rotor is connected to the B phase of the first pole group of said second rotor, the B phase of the second pole group of said first rotor is connected to the C phase of the first pole group of said second rotor, and the C phase of the second pole group of said first rotor is connected to the B phase of the second pole group of said second rotor.

7. The combination as set forth in claim 6 in which the sequence of connection is repeated one-half times the number of poles.

References Cited by the Examiner
UNITED STATES PATENTS

| | | | |
|---|---|---|---|
| 999,987 | 8/11 | Goldschmidt. | |
| 1,601,410 | 9/26 | Nordfeldt | 321—64 |
| 3,017,553 | 1/62 | Homan | 322—61 |

LLOYD McCOLLUM, *Primary Examiner.*